United States Patent
Matsuo

(10) Patent No.: US 6,866,554 B2
(45) Date of Patent: Mar. 15, 2005

(54) JET PROPULSION BOAT

(75) Inventor: Hisashi Matsuo, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/231,199

(22) Filed: Aug. 30, 2002

(65) Prior Publication Data

US 2004/0203297 A1 Oct. 14, 2004

(30) Foreign Application Priority Data

Sep. 7, 2001 (JP) ........................................ 2001-272536

(51) Int. Cl.⁷ ............................................. B63H 21/10
(52) U.S. Cl. ................................. 440/88 T; 440/88 C
(58) Field of Search ........................... 440/88 R, 88 C, 440/88 D, 88 T, 2

(56) References Cited

U.S. PATENT DOCUMENTS

| | | | | |
|---|---|---|---|---|
| 2,866,431 A | * | 12/1958 | Conover ..................... 114/185 |
| 4,850,908 A | * | 7/1989 | Nakase et al. ................. 440/39 |
| 5,061,214 A | * | 10/1991 | Monaghan ................ 440/88 R |
| 5,067,918 A | * | 11/1991 | Kobayashi .................... 440/39 |
| 5,080,617 A | * | 1/1992 | Broughton et al. ............ 440/2 |
| 5,150,663 A | * | 9/1992 | Kobayashi .................. 116/209 |
| 5,536,189 A | * | 7/1996 | Mineo ...................... 440/89 R |
| 5,746,054 A | * | 5/1998 | Matte ........................... 60/310 |
| 5,934,953 A | * | 8/1999 | Kobayashi .................... 440/38 |
| 6,015,320 A | * | 1/2000 | Nanami .................... 440/88 L |
| 6,261,140 B1 | * | 7/2001 | Yoshida et al. ........... 440/88 R |
| 6,331,127 B1 | * | 12/2001 | Suzuki .................... 440/88 R |
| 6,478,644 B1 | * | 11/2002 | Ozawa et al. ............. 440/89 R |
| 6,524,149 B1 | * | 2/2003 | Hattori ..................... 440/88 L |
| 6,551,154 B1 | * | 4/2003 | Jaszewski et al. ............. 440/2 |

FOREIGN PATENT DOCUMENTS

JP 07-144697 6/1995

* cited by examiner

*Primary Examiner*—Andrew D. Wright
(74) *Attorney, Agent, or Firm*—Birch, Stewart, Kolasch & Birch, LLP

(57) ABSTRACT

To provide a jet propulsion boat in which cooling water is prevented from flowing into the footrest deck or from splashing toward the footrest deck and wherein the occupant can easily recognize the cooling water. A jet propulsion boat includes a vessel body constructed of a lower hull including a ship bottom and an upper hull superimposed thereon. A saddle-riding type seat is provided at the center of the upper surface of the upper hull with footrest decks provided on the left and right of the saddle-riding type seat. An engine and an exhaust system are provided in the interior of the vessel body. The jet propulsion boat includes cooling flow paths for forcing the engine and the exhaust system to be cooled by cooling water. The cooling water discharge ports from the cooling flow paths is provided on the rear surface of the vessel body, except for the portion immediately behind the saddle-riding type seat.

13 Claims, 13 Drawing Sheets

JET PROPULSION BOAT

CROSS-REFERENCE TO RELATED APPLICATIONS

The present application claims priority under 35 USC 119 to Japanese Patent Application No. 2001-272536 filed on Sep. 7, 2001 the entire contents thereof is hereby incorporated by reference.

BACKGROUND OF THE INVENTION

1. Field of the Invention

The present invention relates to a jet propulsion boat provided with a jet propulsion unit in the pump chamber in the vessel body, being propelled by driving the jet propulsion unit by an engine.

2. Description of Background Art

A jet propulsion boat is a vessel provided with a jet pump mounted at the rear portion of the vessel body that is propelled by sucking water from the vessel bottom by driving the jet pump by the engine and discharging the water rearwardly.

A jet propulsion boat is disclosed in JP-A-7-144697 that is entitled an "EXHAUST PIPE COOLING DEVICE FOR SURFACE CRAFT." The jet propulsion boat in this publication comprises an exhaust-system-cooling system for cooling the exhaust system by flowing cooling water into the water jacket of the exhaust system, providing the used cooling water for cooling through a pilot water hose and discharging the used cooling water from a discharge port of the pilot water hose on the left side surface of the vessel body.

Since the position of discharging cooling water is set to the left side surface of the vessel body, the occupant can easily recognized the discharged cooling water. Therefore, the occupant can determine the operating state of the exhaust-system-cooling system from the cooling water discharging state.

However, since the discharge port of the pilot water hose is positioned on the front side surface of the footrest deck, when the jet propulsion boat rotates for example, cooling water discharged from the exhaust port of the pilot water hose may flow into the footrest deck or splash toward the footrest deck.

As a measure for preventing discharged cooling water from flowing into the footrest deck or splashing toward the footrest deck, it is conceivable to move the discharge port for the pilot water hose. However, moving the discharge port of the pilot water hose, the occupant may not be able to recognize cooling water discharged form the discharge port.

SUMMARY AND OBJECTS OF THE INVENTION

Accordingly, it is an object of the present invention to provide a jet propulsion boat in which cooling water is prevented from flowing into the footrest deck or from splashing toward the footrest deck. Thus, the operator of the vehicle can easily recognize cooling water.

In order to solve the problem described above, the present invention provides a jet propulsion boat including a vessel body constructed of a lower hull having a ship bottom and an upper hull superimposed thereon. A saddle-riding type seat extends in the fore-and-aft direction and is provided at the center of the upper surface of the upper hull. Footrest decks are provided on the left and right of the saddle-riding type seat with an engine and an exhaust system provided in the interior of the vessel body. A cooling system is provided for forcing the engine or the like to be cooled by water wherein the cooling water discharge port from the cooling system is provided on the rear surface of the vessel body, except for the portion immediately behind the saddle-riding type seat.

With the provision of the discharge port from the cooling system on the rear surface of the vessel body, except for the portion immediately behind the saddle-riding type seat, cooling water discharged from the discharge port is prevented from flowing into the footrest deck or from splashing towards the footrest deck.

While the jet propulsion boat is operated, the occupant verifies that cooling water is discharged from the discharge port of the cooling system and determines the operating state of the cooling system. However, when the discharge port from the cooling system is provided on the portion immediately behind the seat, cooling water discharged from the discharging port is hidden by the seat. Thus, the occupant may not visually verify the discharge of the cooling water.

Therefore, according to the present invention, the discharge port from the cooling system is provided at the rear surface of the vessel body, except for the portion immediately behind the seat, that is, at the position offset from the portion immediately behind the seat. Therefore, the occupant can easily verify cooling water discharged from the discharge port.

The invention according to the present includes the discharge port that is provided in the vicinity of the lower side of the joint between the lower hull and the upper hull on the side of the lower hull.

The opening of the discharge port is positioned in the vicinity of the lower side of the joint between the lower hull and the upper hull on the side of the lower hull. Therefore, the opening of the discharge port is set to a position lower than the height of the footrest deck. Thus, cooling water discharged from the discharge port can be reliably prevented from flowing into the footrest deck or from splashing toward the footrest deck further.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
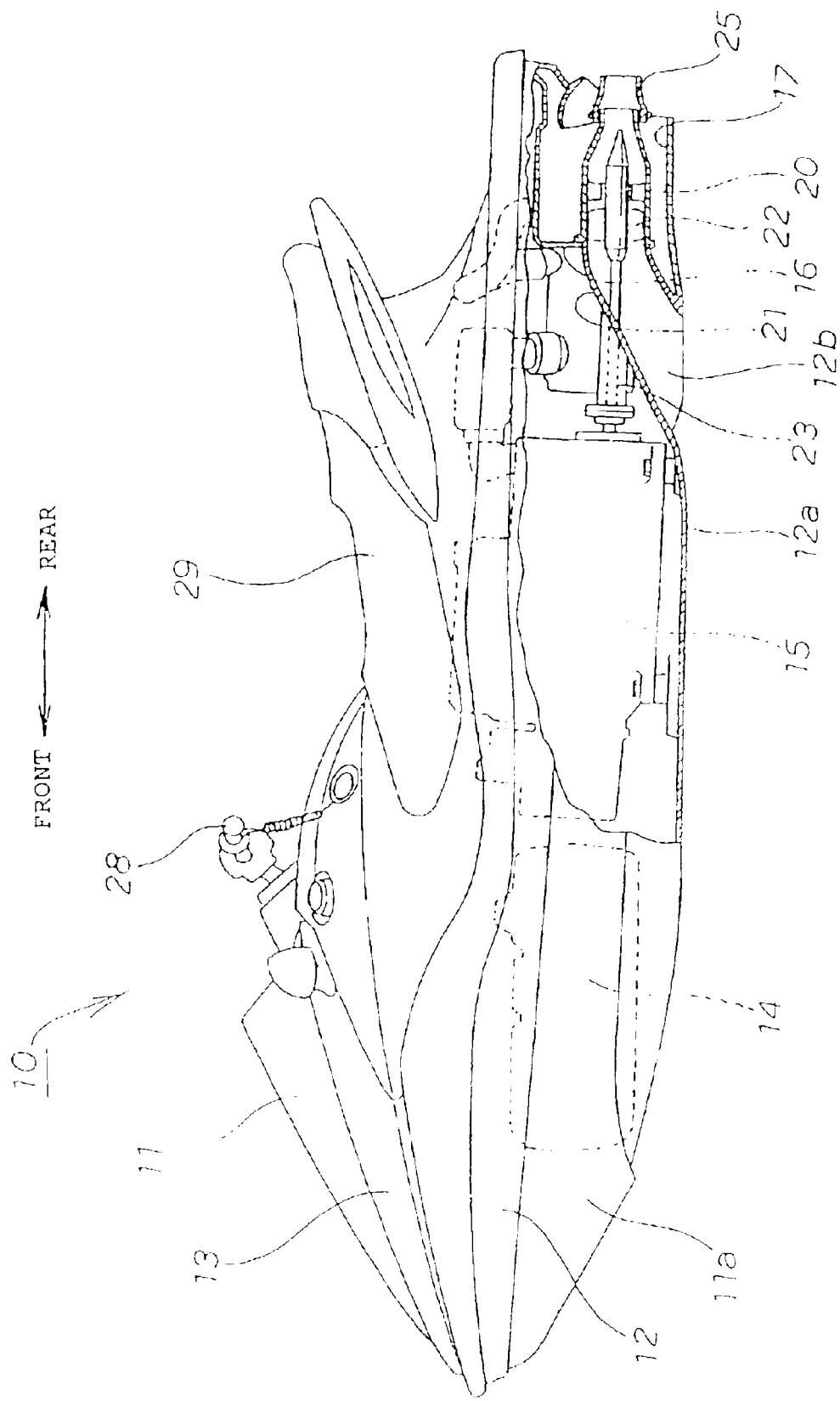
FIG. 1 is a side view of a jet propulsion boat according to the present invention.

Referring now to the drawings, an embodiment of the present invention will be described below wherein FIG. 1 is a side view of a jet propulsion boat provided with a cooling system according to the present invention.

The jet propulsion boat 10 comprises a vessel body 11 including a lower hull 12 having a ship bottom 12a and an upper hull 13 superimposed thereon. A fuel tank 14 is mounted on the front portion 11a of the vessel body 11. An engine 15 is provided rearwardly of the fuel tank 14 with a jet pump chamber 16 provided rearwardly of the engine 15. A jet pump (jet propulsion unit) 20 is provided in the jet pump chamber 16 with a steering handle 28 mounted upwardly of the fuel tank 14. A saddle-riding type seat 29 is mounted rearwardly of the steering handle 28. A cooling system for the jet propulsion boat will be described later.

The jet pump 20 has a housing 21 extending rearwardly from an opening 12b on the ship bottom 12a with an impeller 22 rotatably mounted in the housing 21. The impeller 22 is connected to a drive shaft 23 of the engine 15.

With the jet pump 20, by driving the engine 15 and thus rotating the impeller 22, water is sucked through the opening 12b on the ship bottom 12a and emitted through the housing 21 from a steering pipe (steering nozzle) 25.

With the provision of the steering nozzle 25 at an opening 17 at the rear end of the jet pump chamber 16, a jet of water emitted from the steering nozzle 25 can be emitted from the opening 17 at the rear end of the jet pump chamber 16 rearwardly of the vessel body 11.

The steering nozzle 25 is a member mounted at the rear end of the housing 21 so as to be capable of being swung freely in the lateral direction. The steering nozzle 25 is a nozzle to be used for steering the direction of the vessel body 11 by being swung in the lateral direction via the steering handle 28.

The jet propulsion boat 10 can be propelled by supplying fuel to the engine 15 from the fuel tank 14 for driving the engine 15, transmitting the driving force of the engine 15 to an impeller 24 through the drive shaft 23, sucking water through the opening 12b of the ship bottom 12a by rotating the impeller 24, and emitting a jet of water from the steering nozzle 25 through the rear end of the housing 21.

Figure 2:
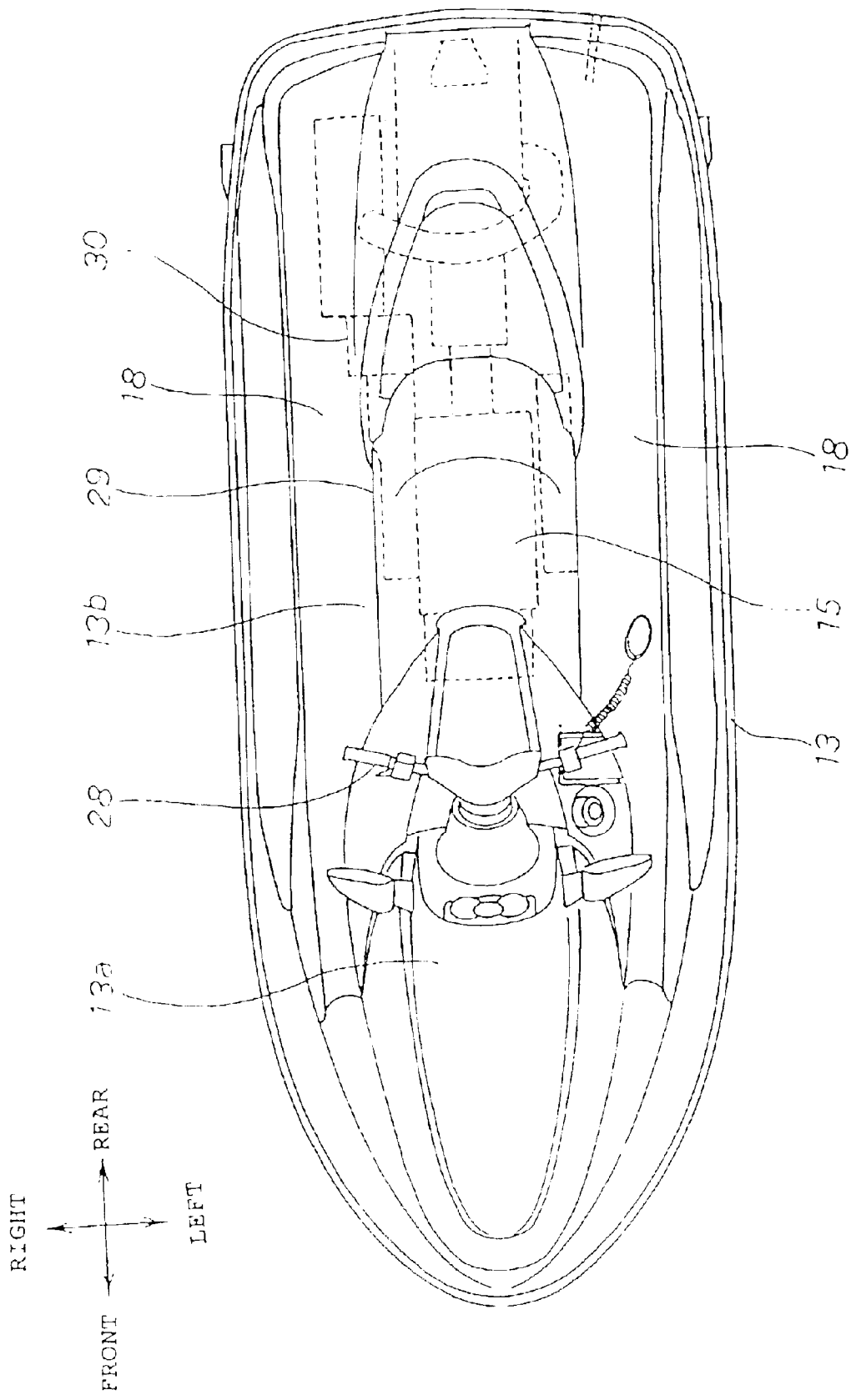
FIG. 2 is plan view of the jet propulsion boat according to the present invention.

FIG. 2 is a plan view of the jet propulsion boat provided with a cooling system according to the present invention, showing a state in which the steering handle 28 is provided on the upper front portion 13a of the upper hull 13 with the saddle-riding type seat 29 extending in the fore-and-aft direction rearwardly of the steering handle 28 at the center 13b of the upper surface of the upper hull 13 (widthwise center). Footrest decks 18 are provided on the left side and the right side of the saddle-riding type seat 29. The engine 15 and an exhaust system 30 are provided in the vessel body 11 with the cooling system being provided for cooling the jet propulsion boat (described later) and for cooling the engine 15 and the exhaust system 30.

Figure 3:
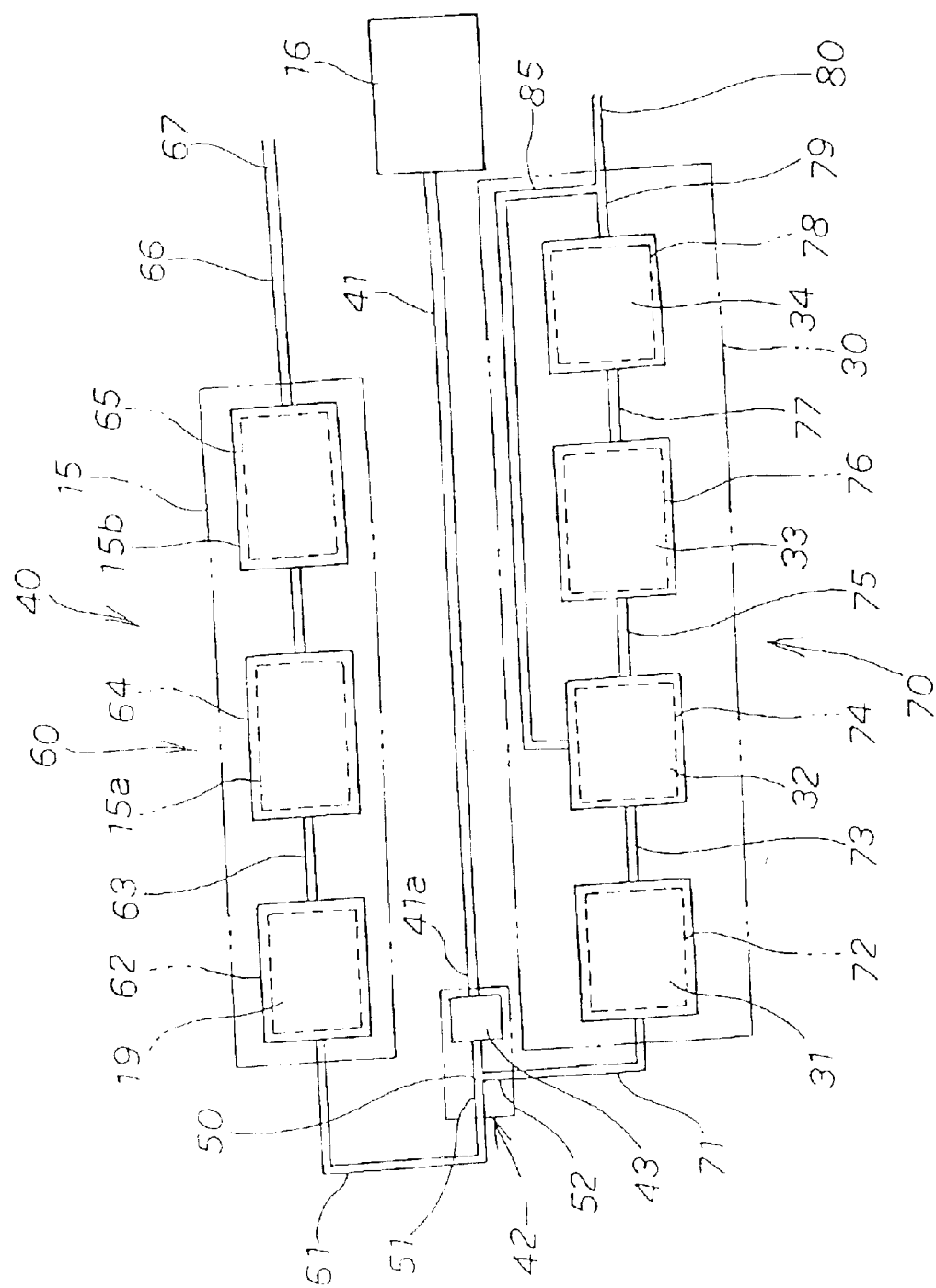
FIG. 3 is a block diagram of the cooling system for a jet propulsion boat according to the present invention.

FIG. 3 is a block diagram of the cooling system for a jet propulsion boat according to the present invention.

The cooling system 40 for a jet propulsion boat forces the engine 15 to be cooled and forces the exhaust system 30 to be cooled by taking a part of a jet of water emitted from the jet pump 20 (shown in FIG. 1) into an intake path 41 as cooling water and diverging the cooling water taken into the intake path 41 at a diverging duct 50 in a one-way valve unit 42 for flowing the cooling water into the engine-cooling flow path 60 and the exhaust-system-cooling flow path 70.

The intake path 41a is provided with the one-way valve unit 42 at a discharge port 41a, and the one-way valve unit 42 is provided with a one-way valve 43 integrated therein at the intake path 41 side. A diverging duct 50 is integrally provided on the opposite side of the intake path 41.

The engine-cooling flow path 60 is connected to a first diverged discharge port 51 diverged by the diverging duct 50. The exhaust-system-cooling flow path 70 is connected to a second diverged discharge port 52 diverged by the diverging duct 50.

The engine-cooling flow path 60 is constructed in such a manner that the feed port of an oil-cooler-cooling duct (cooling water jacket) 62 is connected to the first diverged discharge port 51 via a first engine-cooling flow path 61. The discharge port of the oil-cooler-cooling duct 62 is connected to the feed port of a cylinder-block-cooling duct (cooling water jacket) 64 via a second engine-cooling flow path 63. The discharge port of the cylinder-block-cooling duct 64 is connected to the feed port of a cylinder-head-cooling duct (cooling water jacket) 65. The discharge port of the cylinder-head-cooling-duct 65 is connected to the intake port of a third engine-cooling flow path 66 with a cooling water discharge port 67 of the third engine-cooling flow path 66 facing towards the interior of the jet pump chamber 16 (See FIG. 1).

The exhaust-system-cooling flow path 70 is constructed in such a manner that the feed port of an intercooler-cooling duct (cooling water jacket) 72 is connected to a second diverged discharge port 52 via a first exhaust-system-cooling flow path 71. The discharge port of the intercooler-cooling duct 72 is connected to the feed port of an exhaust-manifold-cooling duct (cooling water jacket) 74 via a second exhaust-system-cooling flow path 73. The discharge port of the exhaust-manifold-cooling duct 74 is connected to the feed port of a turbocharger-cooling duct (cooling water jacket) 76 via a third exhaust-system-cooling flow path 75 with the discharge port of the turbocharger-cooling duct 76 being connected to an exhaust-pipe-cooling duct (cooling water jacket) 78 via a fourth exhaust-system-cooling flow path 77. The intake port of a fifth exhaust-system-cooling flow path 79 is connected to the discharge port of the exhaust-pipe-cooling duct 78 and a cooling water drain 80 at the rear end 79b of the fifth exhaust-system-cooling flow path 79 is provided on the rear surface 11b of the vessel body 11 except for the portion 29a immediately behind the saddle-riding type seat 29 shown in FIG. 2. More specifically, the cooling water drain 80 is positioned on the rear surface 11b on the left side of the saddle-riding type seat 29.

Figure 4:
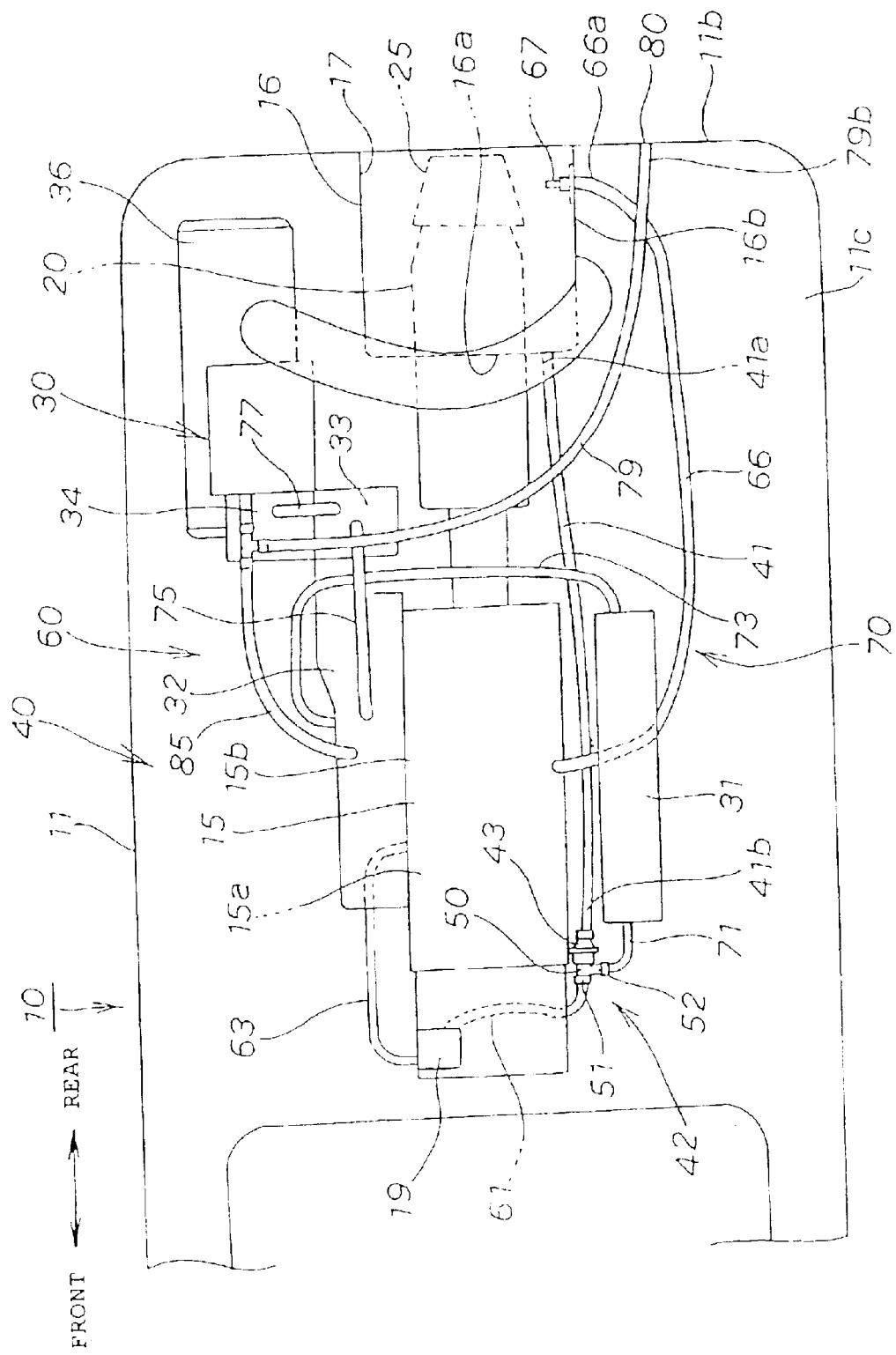
FIG. 4 is a plan view of the cooling system for a jet propulsion boat according to the present invention.

The portion where the cooling water drain 80 is to be provided is described to be the rear surface 11b of the vessel body 11, more specifically, it corresponds to the portion in the vicinity of the left side wall as shown in FIG. 4.

However, the portion where the cooling water drain 80 is to be provided is not limited to this and could possibly be provided, for example, in the portion in the vicinity of the right side wall.

A by-pass flow path 85 is provided for preferably adjusting the flow rate of cooling water.

FIG. 4 is a plan view of the cooling system for a jet propulsion boat according to the present invention, showing a state in which the jet pump chamber 16 is provided in the rear portion 11c of the vessel body 11. The jet pump 20 is provided in the jet pump chamber 16 with the engine 15 being provided forwardly of the jet pump 20. The drive shaft 23 (shown in FIG. 1) of the engine 15 is connected to the jet pump 20 with the steering nozzle 25 of the jet pump 20 facing towards the opening 17 at the rear end of the jet pump chamber 16.

The jet propulsion boat 10 can be propelled by emitting a jet of water from the steering nozzle 25 by driving the jet pump 20 with the engine 15 and injecting a jet of water from the opening 17 at the rear end of the jet pump chamber 16 rearwardly of the vessel body 11.

The cooling system 40 for a jet propulsion boat can force the engine 15 and the exhaust system 30 to be cooled respectively by taking a part of a jet of water emitted from the jet pump 20 into the intake path 41 as cooling water and diverging the cooling water taken into the intake path 41 at the diverging duct 50 of the one-way valve unit 42 and providing the cooling water into the engine-cooling flow path 60 and the exhaust-system-cooling flow path 70.

The intake path 41 is constructed in such a manner that the rear end 41a is attached to a front wall 16a of the jet pump chamber 16 and the intake port (not shown) at the rear end 16a is connected to the jet pump 20 and is arranged so as to extend forward along the left side surface of the jet pump 20 and the left side surface of the engine 15 with the discharge port at the front end 41b disposed in the vicinity of the front end of the engine 15.

The one-way valve unit 42 is provided at the front end 41b of the intake path 41. The one-way valve unit 42 is provided with the one-way valve 43 on the side of the intake path 41 and the diverging duct 50 on the opposite side from the intake path 41 integrally formed therewith.

The engine-cooling flow path 60 is connected to the first diverged discharge port 51 diverged by the diverging duct 50, and the exhaust-system-cooling flow path 70 is connected to the second diverged discharge port 52 diverged by the diverging duct 50.

The engine-cooling flow path 60 is constructed in such a manner that the first diverged discharge port 51 is connected to the cooling duct of an oil cooler 19 via the first engine-cooling flow path 61, the cooling duct of the oil cooler 19 is connected to the cooling duct of a cylinder block 15a via the second engine-cooling flow path 63, the cooling duct of the cylinder head 15a is connected to the cooling duct of the cylinder head 15b, the cooling duct of the cylinder head 15b is connected to the intake port of the third engine-cooling flow path 66, and the rear end 66a of the third engine-cooling flow path 66 is attached to the left side wall 16b of the jet pump chamber 16, so that the cooling water drain 67 at the rear end 66a faces towards the interior of the jet pump chamber 16 and is disposed in the vicinity of the opening 17 at the rear end of the jet pump chamber 16.

The exhaust-system-cooling flow path 70 is constructed in such a manner that the cooling duct of an intercooler 31 is connected to the second diverged discharge port 52 via the first exhaust-system-cooling flow path 71, the cooling duct of the inter cooler 31 is connected to the cooling duct of an exhaust manifold 32 via the second exhaust-system-cooling flow path 73, the cooling duct of the exhaust manifold 32 is connected to the cooling duct of a turbocharger 33 via the third exhaust-system-cooling flow path 75, the cooling duct of the turbocharger 33 is connected to the cooling duct of an exhaust pipe 34 via the fourth exhaust-system-cooling flow path 77, the intake port of the fifth exhaust-system-cooling flow path 79 is connected to the cooling duct of the exhaust pipe 34, and the cooling water discharge port 80 at the rear end 79a of the fifth exhaust-system-cooling flow path 79 is provided on the rear surface 11b of the vessel body 11 except for the portion 29a immediately behind the saddle-riding type seat 29 (as shown in FIG. 2).

Figure 5:
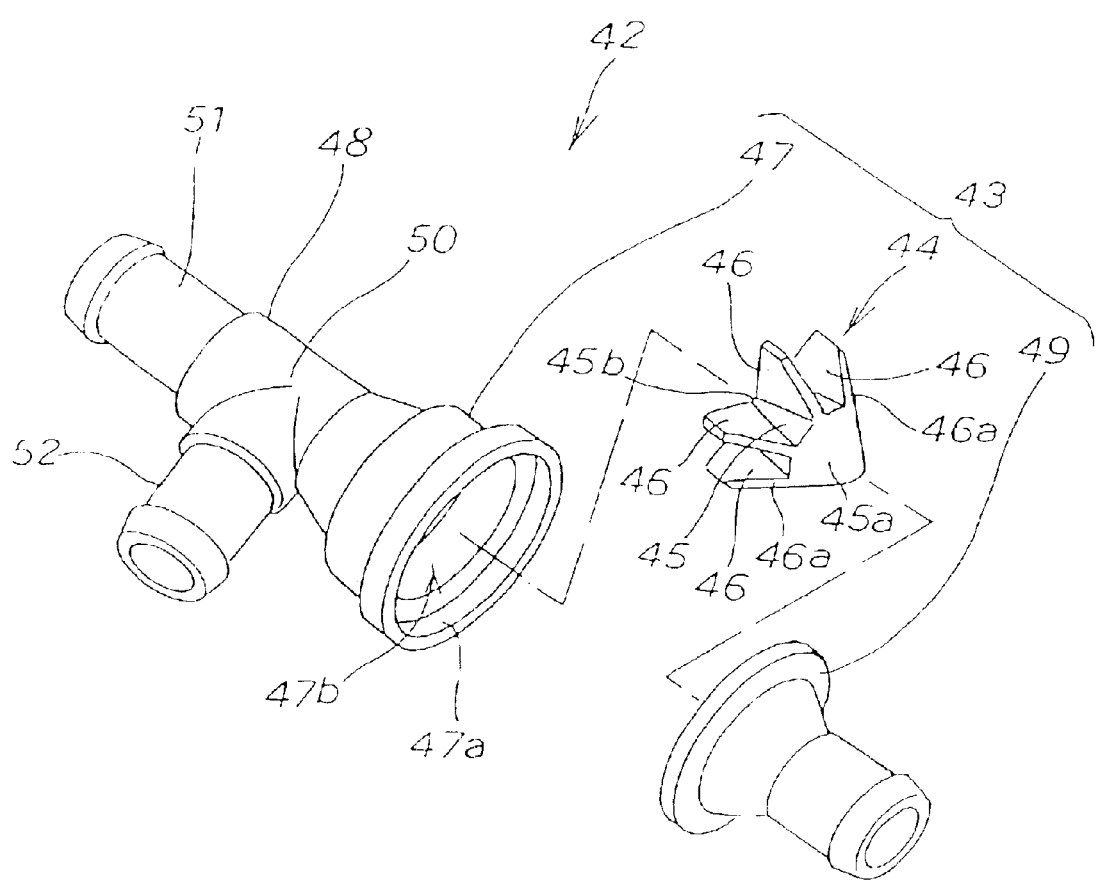
FIG. 5 is an exploded perspective view of a one-way valve unit constituting the cooling system for a jet propulsion boat according to the present invention.

FIG. 5 is an exploded perspective view of the one-way valve unit constituting the cooling system for a jet propulsion boat according to the present invention.

The one-way valve unit 42 comprises a body 48 including a casing 47 for accommodating a valve body 44 of the one-way valve 43 and a diverging duct 50, the valve body 44 is accommodated in a storage recess 47b from an opening 47a of the casing 47, and a cap 49 for covering the opening 47a with the valve body 44 stored in the storage recess 47b.

The valve body 44 comprises a core portion 45 formed into the shape of a tapered cone at an extremity 45a thereof. The core portion 45 is formed so that the diameter thereof is reduced gradually from the conical extremity 45a toward a proximal portion 45b. A plurality of (six) blades 46 . . . extend radially from the outer surface of the core portion 45. The plurality of blades 46 . . . have front end surfaces 46a . . . formed into inclined surfaces being flush with the outer periphery of the conical extremity 45a.

Figure 6A:
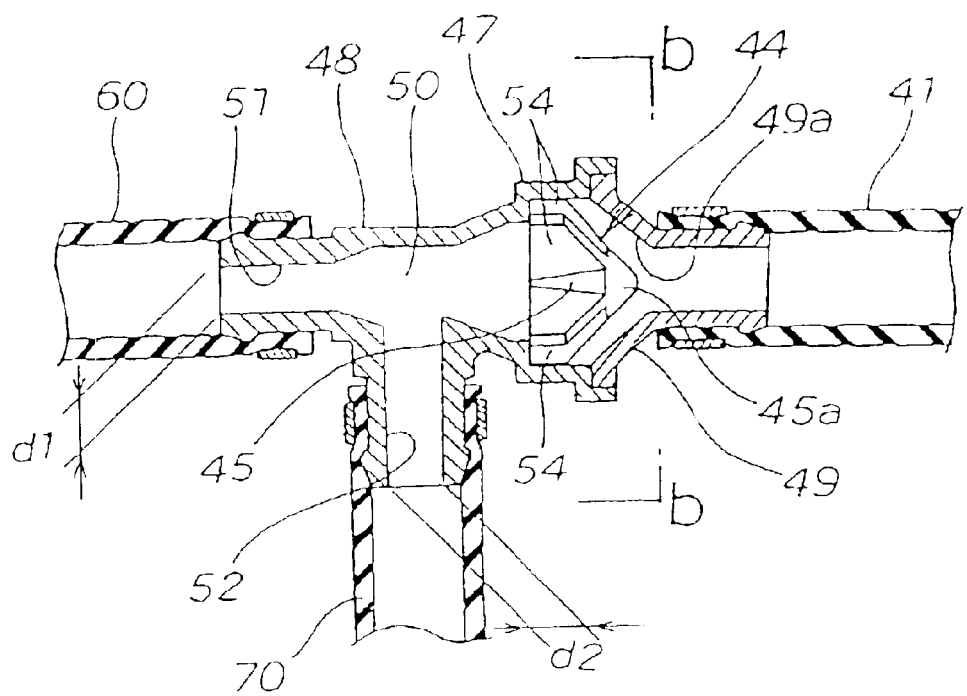
FIGS. 6(a) and 6(b) show explanatory drawings illustrating the one-way valve unit constituting the cooling system for a jet propulsion boat according to the present invention.
Figure 6B:
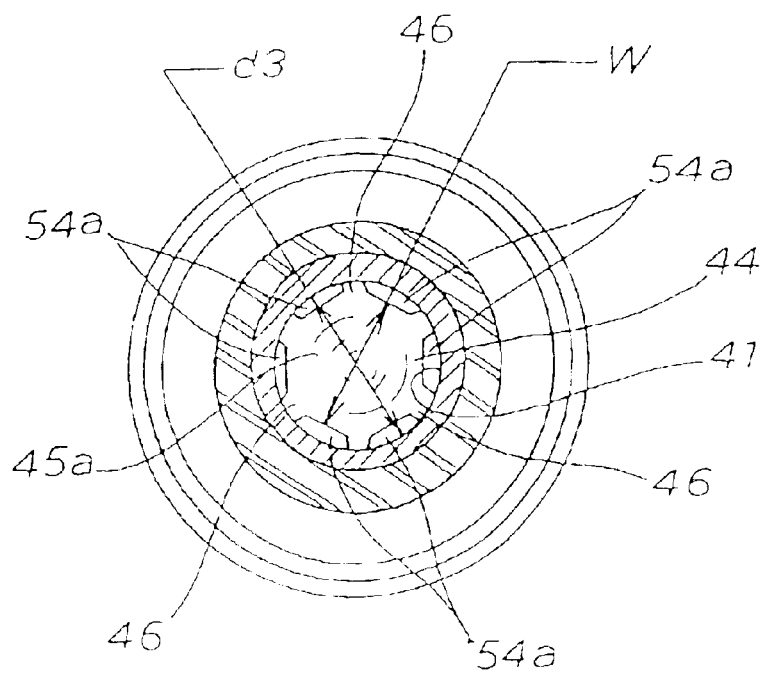

FIGS. 6(a) and 6(b) are explanatory drawings illustrating the one-way valve unit constituting the cooling system for a jet propulsion boat according to the present invention. FIG. 6(a) is a cross-sectional view and FIG. 6(b) is a cross-sectional view taken along the line b-b of the FIG. 6(a).

The diverging duct 50 provided in the body 48 is intended to divert the intake path 41 into the first diverged discharge port 51 and the second diverged discharge port 52. The first diverged discharge port 51 is connected to the engine-cooling flow path 60 and the second diverged discharge port 52 is connected to the exhaust-system-cooling flow path 70.

The one-way valve 43 is operated in such a manner that when cooling water flows from the intake path 41 towards the valve body 44, the valve body 44 is moved away from a valve seat 49a by the hydraulic pressure of the cooling water and is retained in a state being away from the valve seat 49a (the state shown in the FIG. 6(a)).

In addition, the one-way valve 43 is further operated in such a manner when washing water is flowing from the first diverged discharge port 51 towards the valve body 44, the valve body 44 is moved towards the valve seat 49a by the hydraulic pressure of washing water and bought into abutment with the valve seat 49a.

Moving the valve body 44 away from the valve seat 49a allows cooling water to flow through the spaces 54 . . . between the blade 46 and the blade 46, and thus cooling water can flow from the intake path 41 towards the diverging duct 50.

On the other hand, bringing the valve body 44 into abutment with the valve seat 49a may prevent washing water flowing from the first diverged discharge port 51 into the diverging duct 50 from flowing into the intake path 41.

The inner diameter d1 of the first diverged discharge port 51 may be 8 mm for example, and the inner diameter d2 of the second diverged discharge port 52 may be 10 mm for example. The relation between the inner diameter d1 and the inner diameter d2 is d1<d2.

As shown in the FIG. 6(b), by determining the maximum width W of the extremity 45a of the valve body 44 to be smaller than the inner diameter d3 of the intake path 41, parts of the spaces 54 . . . between the blades 46 of the valve body 44 (fine flow paths) 54a . . . may be placed in the intake path 41. The inner diameter d3 may be 12 mm for example.

With the valve body 44 constructed as described above, when the valve body 44 abuts against the valve seat 49a, fine flow paths 54a . . . may be provided between the valve seat 49a and the valve body 44 as flow paths for allowing a small quantity of washing water.

Therefore, a small quantity of washing water out of washing water flowing from the first diverged discharge port 51 to the diverged duct 50 may flow through the fine flow paths 54a . . . to the side of the intake path 41.

As a consequent, the interior of the jet pump 20 (shown in FIG. 1) can easily be washed with a small quantity of washing water passing through the fine flow paths 54a. . . . Therefore, the jet propulsion boat 10 (shown in FIG. 1) can be washed effectively without taking too much time and effort.

In addition, since the quantity of washing water that passes through the fine flow paths 54a . . . is small, most of the cooling water used for cooling the engine-cooling flow path 60 may be supplied to the exhaust-system-cooling flow path 70. Therefore, the exhaust-system-cooling flow path 70 may be washed satisfactorily.

Figure 7:
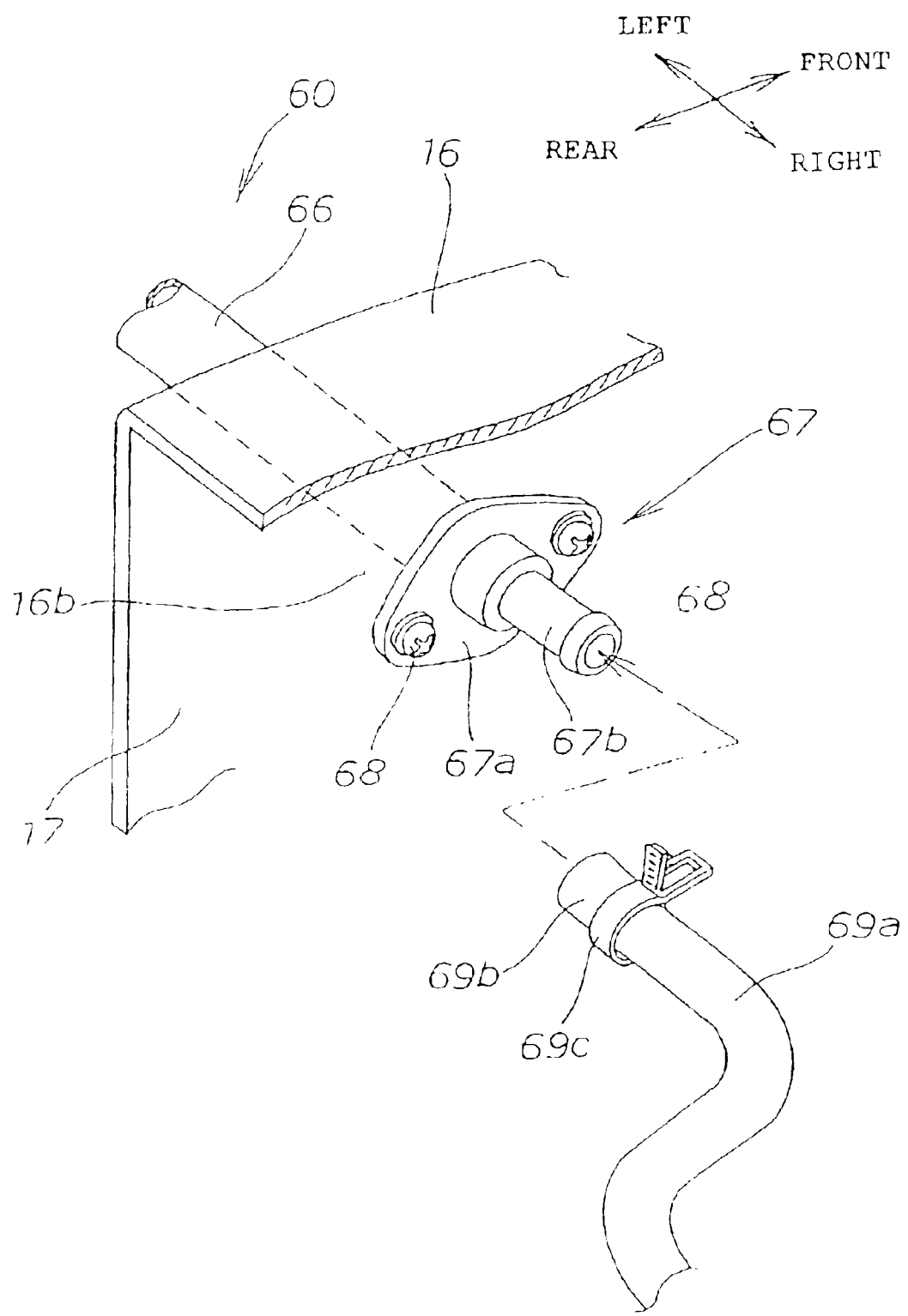
FIG. 7 is a perspective view of the cooling water discharge port (for cooling the engine) constituting the cooling system for a jet propulsion boat according to the present invention.

FIG. 7 is a perspective view of the cooling water discharge port (for cooling engine) constituting the cooling system for a jet propulsion boat according to the present invention.

The cooling system 40 for a jet propulsion boat shown in FIG. 4 is provided with the cooling water discharge port 67 of the engine-cooling flow path 60 in the vicinity of the opening 17 at the rear end of the jet pump chamber 16.

The cooling water discharge port 67 of the engine-cooling flow path 60 is a discharge port for discharging cooling water used for cooling the engine-cooling flow path 60 toward the outside, and serves also as a feed port for feeding washing water to the engine-cooling flow path 60 and the exhaust-system-cooling flow path 70.

The cooling water discharge port 67 is attached on the left side wall 16b of the jet pump chamber 16 in such a manner that a flange 67a is secured in the vicinity of the opening 17 at the rear end of the left side wall 16b with bolts 68, 68, and a nozzle 67b extends from the flange 67a so as to be orthogonal to the left side wall 16b.

When feeding washing water to the cooling water discharge port 67, a tap water hose 69a can be securely attached on the nozzle 67b of the cooling water discharge port 67 by fitting the tip 69b of the tap water hose 69a on the nozzle 67b of the cooling water discharge port 67, and tightening the outer periphery of the tap water hose 69a by the lock spring 69c.

Accordingly, since a disconnection of the tap water hose 69a from the nozzle 67b of the cooling water discharge port 67 may be prevented at the time of flashing (washing), a washing operation can be performed effectively in a short time.

By disposing the cooling water discharge port 67 in the vicinity of the opening 17 at the rear end of the jet pump chamber 16, it is possible to insert a hand into the jet pump chamber 16 through the opening 17 at the rear end of the jet pump chamber 16 and to easily touch the cooling water discharge port 67 with the inserted hand.

Therefore, when tap water is used as washing water for example, the tap water hose 69a for tap water can be attached to the nozzle 67b of the cooling water discharge port 67 relatively easily, and thus the washing operation can be performed easily without taking too much time and effort.

In addition, by providing the cooling water discharge port 67 of the engine-cooling flow path 60 in the vicinity of the opening 17 at the rear end of the jet pump chamber 16, the cooling water discharge port 67 can be hidden by the jet pump chamber 16.

As a consequent, the cooling water discharge port 67 can be hidden so as not to be viewed from the outside, and thus the appearance of the jet propulsion boat 10 can be improved.

Figure 8:
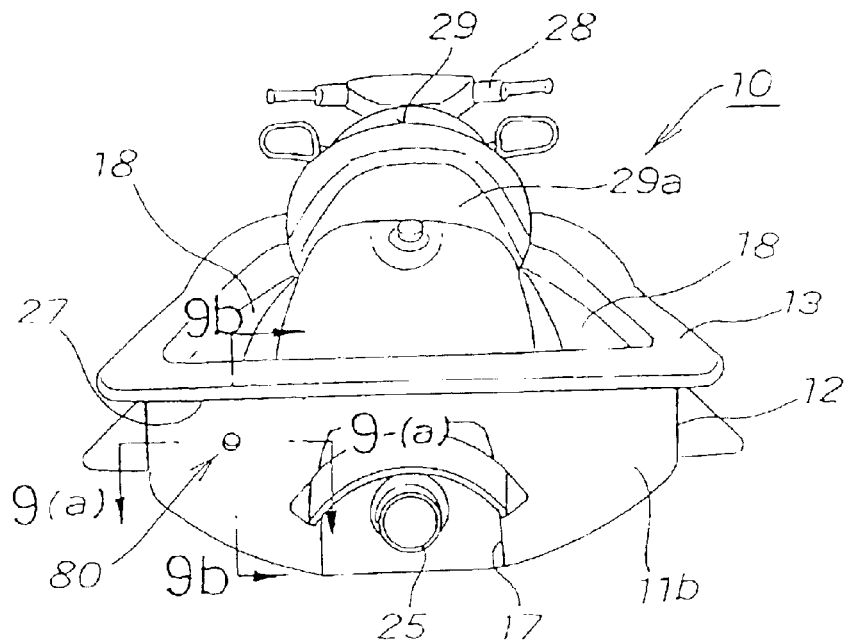
FIG. 8 is a perspective view of the cooling water discharge port (for cooling the exhaust system) constituting the cooling system for a jet propulsion boat according to the present invention.

FIG. 8 is a perspective view of the cooling water discharge port (for cooling the exhaust system) constituting the cooling system for a jet propulsion boat according to the present invention.

The cooling water discharge port 80 of the exhaust-system-cooling flow path 70 is a discharge port for discharging cooling water used for cooling the exhaust-system-cooling flow path 70 to the outside, and serves also as a water pilot hole for detecting whether of not the cooling system 40 for a jet propulsion boat functions normally.

The cooling water discharge port 80 is provided in the vicinity of the lower side of a joint 27 between the lower hull 12 and the upper hull 13 on the side of the lower hull 12.

Figure 9A:
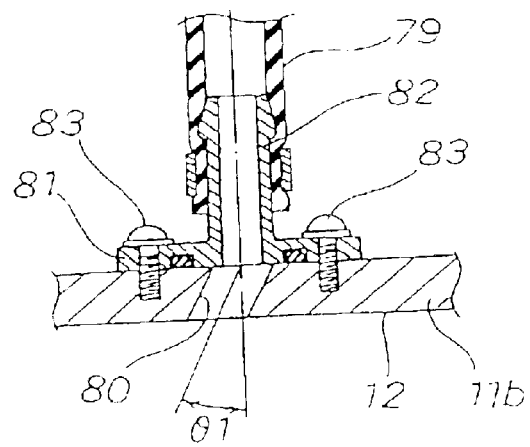
FIGS. 9(a) and 9(b) are cross-sectional views of the cooling water discharge port (for cooling the exhaust system) constituting the cooling system for a jet propulsion boat according to the present invention.
Figure 9B:
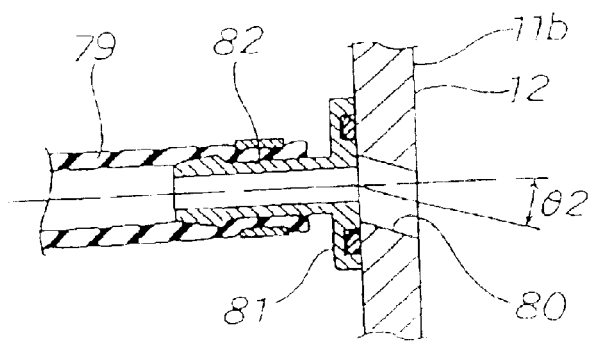

FIGS. 9(a) and 9(b) are cross-sectional views illustrating the cooling water discharge port (for cooling the exhaust system) constituting the cooling system for a jet propulsion boat according to the present invention. FIG. 9(a) is a cross-sectional view taken along the line 9a—9a in FIG. 8, and FIG. 9(b) is a cross-sectional view taken along the line 9b—9b in FIG. 8.

As shown in FIG. 9(a), the cooling water discharge port 80 of the exhaust-system-cooling flow path 70 is a through hole formed in the rear wall constituting the lower hull 12. The discharge port 80 is inclined outwardly by the angle of θ1.

The end of the exhaust-system-cooling flow path 70 can be brought into communication with the cooling water discharge port 80 by securing a flange 81 to the inner side of the rear surface 11*b* of the lower hull 12 with a bolt 83. An entry portion 82 extends from the flange 81 so as to be orthogonal to the rear surface 11*b*. The end of the exhaust-system-cooling flow path 70 is inserted into the entry portion 82.

As shown in FIG. 9(*b*), the cooling water discharge port 80 of the exhaust-system-cooling flow path 70 is inclined downward by the angle of θ2.

In this way, cooling water discharged from the cooling water discharge port 80 can be discharged to the outside of the vessel body 11 by inclining the cooling water discharge port 80 of the exhaust-system-cooling flow path 70 outwardly by the angle of θ2. Therefore, the occupant can easily verify that cooling water is discharged from the cooling water discharge port 80.

Since cooling water can be discharged to the lower side of the left and right decks 18, 18 (shown in FIG. 8) by inclining the cooling water discharge port 80 of the exhaust-system-cooling flow path 70 downwardly by the angle of θ2, it is further ensured that cooling water is prevented from entering to the side of the left and right decks 18, 18.

Referring now to FIG. 10 to FIG. 14, the operation of the cooling system for a jet propulsion boat will be described.

Figure 10A:
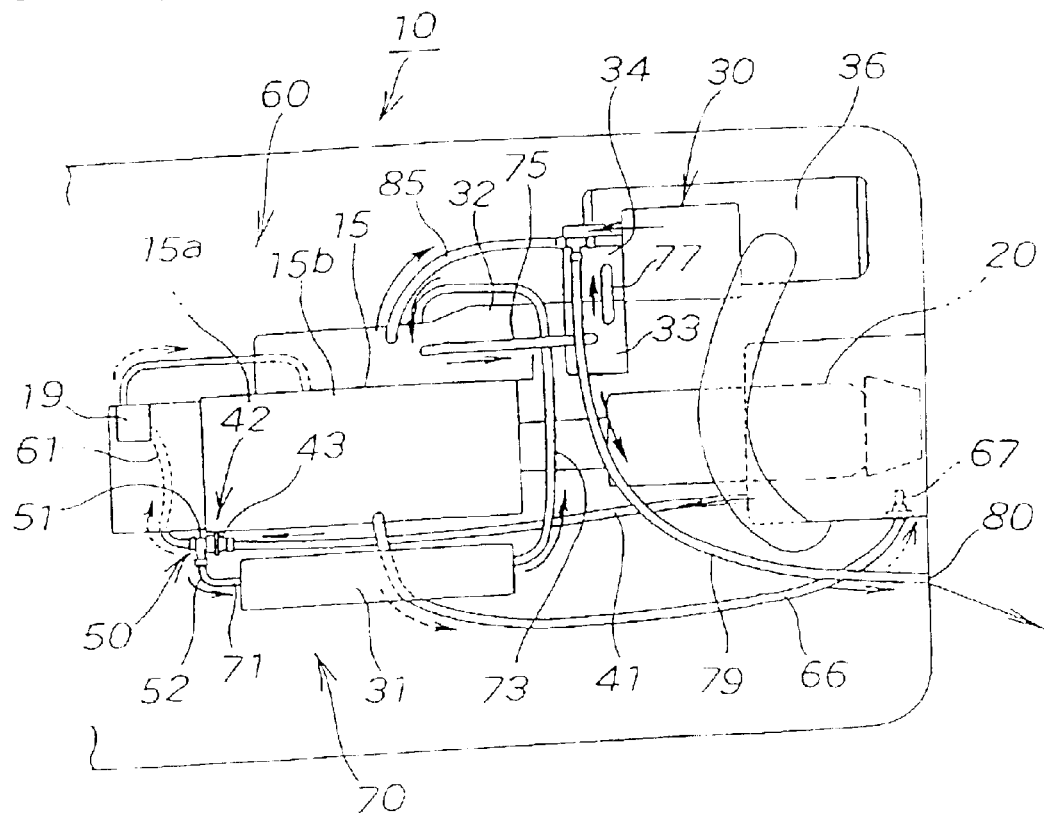
FIGS. 10(a) and 10(b) are first explanatory drawings illustrating an example in which the engine and the exhaust system are cooled by the cooling system for a jet propulsion boat according to the present invention.
Figure 10B:
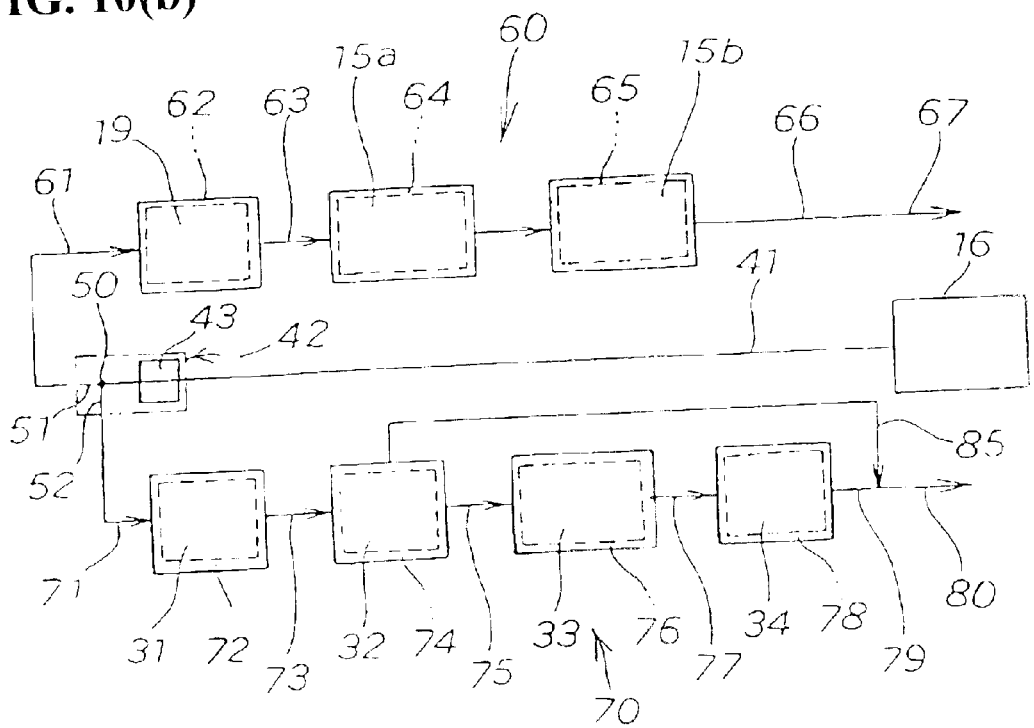

FIGS. 10(*a*) and 10(*b*) are first explanatory drawings illustrating an example in which the engine and the exhaust system are cooled by the cooling system for a jet propulsion boat according to the present invention.

When operating the jet propulsion boat 10, a part of a jet of water emitted from the jet pump 20 is taken into the intake path 41 as cooling water. The cooling water taken into the intake path 41 flows towards the diverging duct 50 through the one-way valve 43 of the one-way valve unit 42.

Cooling water flowing to the diverging duct 50 is diverged into the first diverged discharge port 51 and the second diverged discharge port 52. Cooling water diverged into the first diverged discharge port 51 flows into the engine-cooling flow path 60. Further, cooling water diverged into the second diverged discharge port 52 flows into the exhaust-system-cooling flow path 70.

Cooling water flowing into the engine-cooling flow path 60 flows into the feed port of the oil-cooler-cooling duct 62 through the first engine-cooling flow path 61 and then flows from the feed port into the oil-cooler-cooling duct 62 to cool the oil cooler 19. Cooling water used for cooling the oil cooler 19 flows through the discharge port of the oil-cooler-cooling duct 62 and the second engine-cooling flow path 63 into the feed port of the cylinder-block-cooling duct 64 and then flows from this feed port into the cylinder-block-cooling duct 64 to cool the cylinder block 15*a*.

Cooling water that was used for cooling the cylinder block 15*a* flows through the discharge port of the cylinder-block-cooling duct 64 to the feed port of the cylinder-head-cooling duct 65 and then flows from the feed port to the cylinder-head-cooling duct 65 to cool the cylinder head 15*b*.

Cooling water that was used for cooling the cylinder head 15*b* flows from the discharge port of the cylinder-head-cooling duct 65 into the third engine-cooling flow path 66 and then flows out through the third engine-cooling flow path 66 and the cooling water discharge port 67 to the outside. Accordingly the engine 15 is forced to be cooled by cooling water.

On the other hand, cooling water flowing into the exhaust-system-cooling flow path 70 flows through the first exhaust-system-cooling flow path 71 to the feed port of the intercooler-cooling duct 72 and then flows from the feed port into the intercooler-cooling duct 72 for cooling the intercooler 31.

Cooling water that was used for cooling the intercooler 31 flows through the discharge port of the intercooler-cooling duct 72 and the second exhaust-system-cooling flow path 73 to the feed port of the exhaust-manifold-cooling duct 74 and then flows from the feed port into the exhaust-manifold-cooling duct 74 for cooling the exhaust manifold 32.

Cooling water that was used for cooling the exhaust manifold 32 flows through the discharge port of the exhaust-manifold-cooling duct 74 and the third exhaust-system-cooling flow path 75 to the feed port of the turbocharger-cooling duct 76 and then flows from the feed port into the turbocharger-cooling duct 76 for cooling the turbocharger 33.

Cooling water that was used for cooling the turbocharger-cooling duct 76 flows through the discharge port of the turbocharger-cooling duct 76 and the fourth exhaust-system-cooling flow path 77 to the feed port of the exhaust-pipe-cooling duct 78 and then flows from the feed port into the exhaust-pipe-cooling duct 78 for cooling the exhaust pipe 34.

Cooling water that is used for cooling the exhaust pipe 34 flows into the discharge port of the exhaust-pipe-cooling duct 78 and the intake port of the fifth exhaust-system-cooling duct 79 and then flows from the intake port through the fifth exhaust-system-cooling flow path 79 and the cooling water discharge port 80 to the outside. Accordingly, the exhaust system 30 is forced to be cooled by cooling water. A part of the cooling water used for cooling the exhaust pipe 34 is discharged into the water muffler 36.

Figure 11:
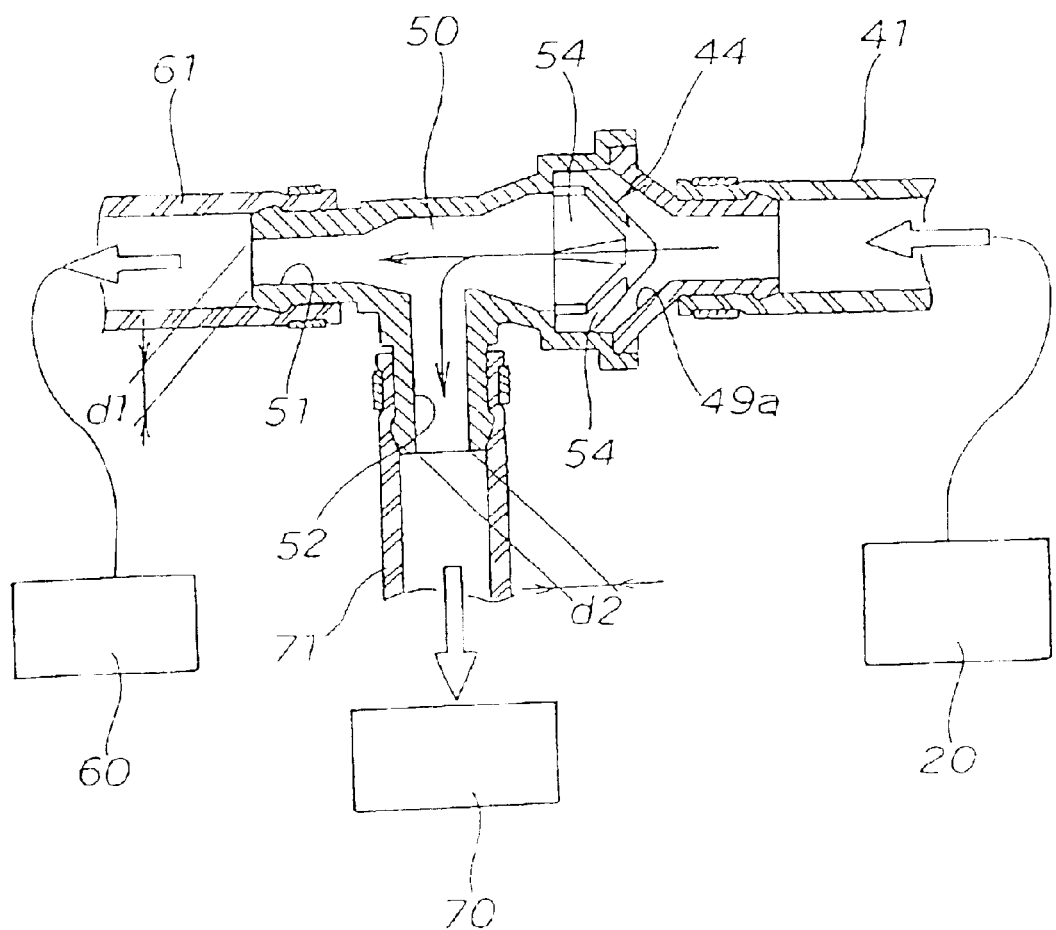
FIG. 11 is a second explanatory drawing illustrating an example in which the engine and the exhaust system is cooled by the cooling system for a jet propulsion boat according to the present invention.

FIG. 11 is a second explanatory drawing showing an example in which the engine and the exhaust system is cooled by the cooling system for a jet propulsion boat according to the present invention.

When cooling water flows from the intake path 41 towards the valve body 44, the valve body 44 is moved away from the valve seat 49*a* by the hydraulic pressure of cooling water, and is kept in a state of being away from the valve seat 49*a*. By moving the valve body 44 away from the valve seat 49*a*, cooling water flows from the intake path 41 to the diverging duct 50.

Cooling water flowing to the diverging duct 50 is diverged into the first diverged discharge port 51 and the second diverged discharge port 52. Cooling water diverged into the first diverged discharge port 51 flows into the engine-cooling flow path 60 and cooling water diverged into the second diverged discharge port 52 flows into the exhaust-system-cooling flow path 70.

The inner diameter d1 of the first diverged discharge port 51 and the inner diameter d2 of the second diverged discharge port 52 are set to be d1<d2, cooling water flown into the engine-cooling flow path 60 and cooling water flowing into the exhaust-system-cooling flow path 70 can be diverged into optimal quantities, respectively.

The cooling system 40 for a jet propulsion boat is provided at the midsection thereof with a one-way valve 43 for enabling cooling water to flow from the intake path 41 to the diverging duct 50 and preventing washing water from flowing from the diverged duct 50 towards the intake path 41.

As a consequent, when operating the jet propulsion boat 10, cooling water taken into the intake path 41 may flow into the diverging duct 50 through the one-way valve 43. Cooling water flowing into the diverging duct 50 is diverged into parts that flow into the first and second diverging duct discharge ports 51, 52, respectively, by the diverging duct 50. Cooling water flowing through the first diverging duct discharge port 51 can flow into the engine-cooling flow path 60, and cooling water flowing thorough the second diverging duct discharge port 52 can flow into the exhaust-system-cooling flow path 70.

Since cooling water can be separated into a part flowing thorough the engine-cooling flow path 60 and a part flowing through the exhaust-system-cooling flow path 70, the temperature of the engine 15 and of the exhaust system 30 can easily be controlled.

Figure 12:
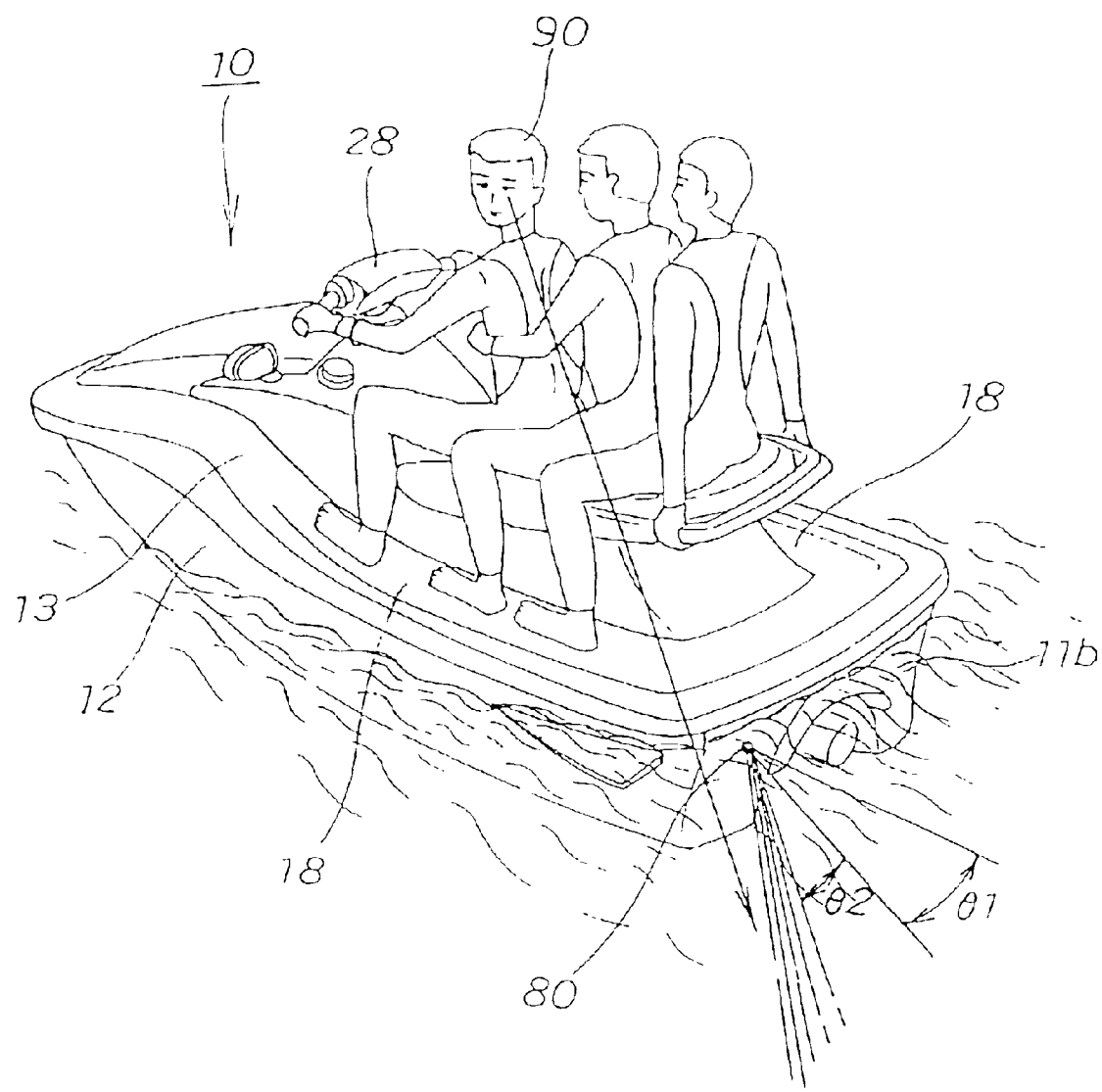
FIG. 12 is a third explanatory drawing illustrating an example in which the engine and the exhaust system are cooled by the cooling system for a jet propulsion boat according to the present invention.

FIG. 12 is a third explanatory drawing illustrating the example in which the engine and the exhaust system are cooled by the cooling system for a jet propulsion boat according to the present invention.

With the provision of the cooling water discharge port 80 of the exhaust-system-cooling flow path 70 on the rear surface 11b of the vessel body 11 except for the portion 29a immediately behind the saddle-riding type seat 29, cooling water discharged from the cooling water discharge port 80 is prevented from flowing into the footrest deck 18 or from splashing toward the footrest deck 18.

Furthermore, the opening of the cooling water discharge port 80 is positioned in the vicinity of the lower side of the joint 27 between the lower hull 12 and the upper hull 13 on the side of the lower hull 12. Therefore, the opening of the cooling water discharge port 80 is set to a position lower than the height of the footrest deck 18, and thus cooling water discharged from the cooling water discharge port 80 can reliably be prevented from flowing into the footrest deck 18 or from splashing towards the footrest deck 18.

In addition, with the construction in which the cooling water discharge port 80 of the exhaust-system-cooling flow path 70 is inclined downwardly by the angle of θ2 (See also FIG. 9(b)), cooling water can be discharged out downwardly of the left and right decks 18, 18 and thus cooling water is further reliably prevented from flowing into the left and right decks 18, 18 or from splashing towards the footrest deck 18.

On the other hand, the cooling water discharge port 80 of the exhaust-system-cooling flow path 70 is provided on the rear surface 11b of the vessel body 11, except for the portion 29a immediately behind the saddle-riding type seat 29, that is, at the portion offset from the portion 29a immediately behind the saddle-riding type seat 29. Therefore, cooling water discharged from the cooling water discharge port 80 can be easily verified by an occupant 90.

Furthermore, cooling water discharged from the cooling water discharge port 80 can be discharged towards the outside of the vessel body 11 by inclining the cooling water discharge port 80 of the exhaust-system-cooling flow path 70 towards the outside by the angle of θ1 (See also FIGS. 9(a) and 9(b)).

Therefore, the occupant 90 can verify that cooling water is easily discharged from the cooling water discharge port 80 and recognize that the cooling system 40 for a jet propulsion boat is functioning normally.

Figure 13A:
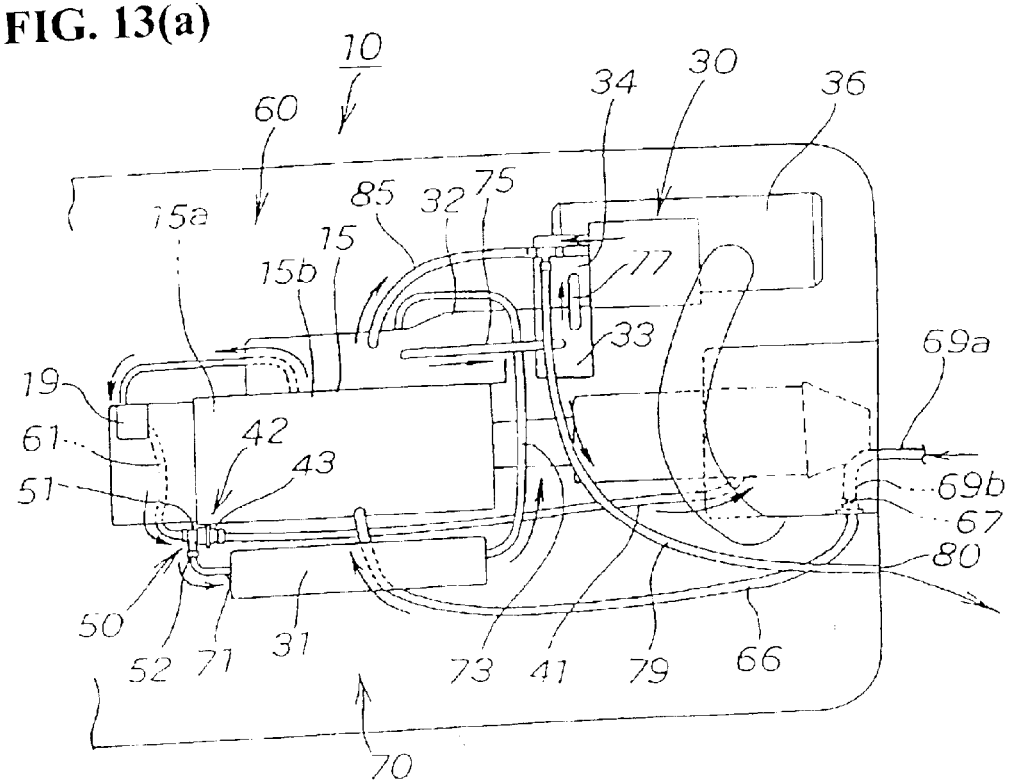
FIGS. 13(a) and 13(b) show first explanatory drawings illustrating an example in which the engine-cooling flow path and the exhaust-system-cooling flow path are washed by the cooling system for a jet propulsion boat according to the present invention.
Figure 13B:
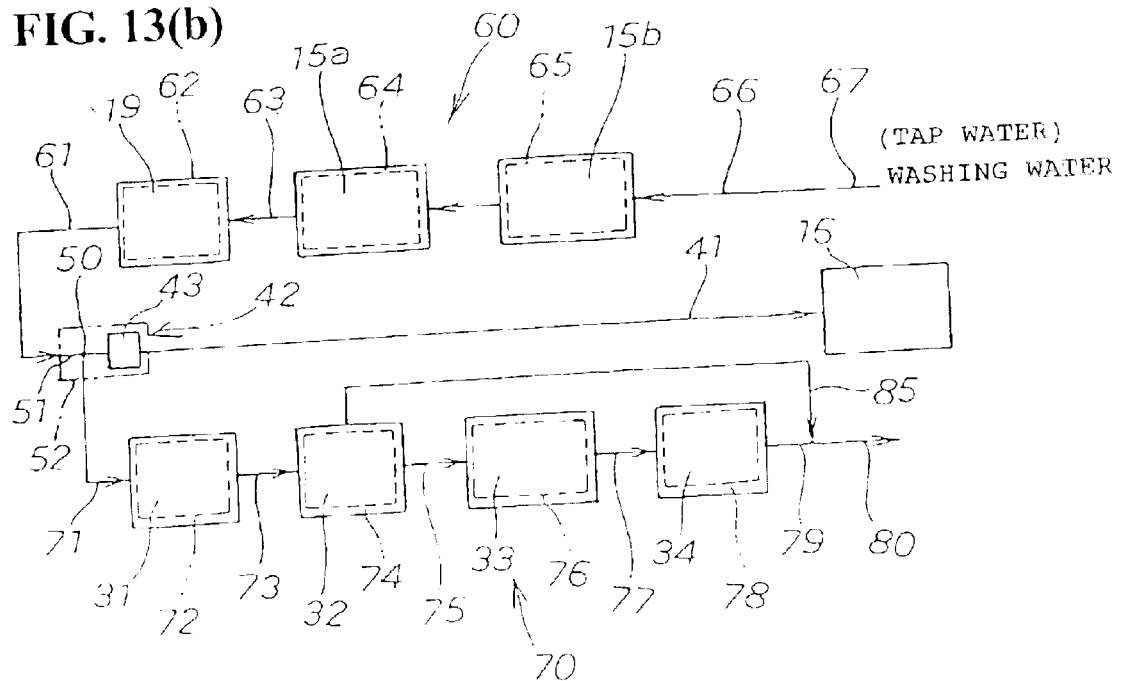

FIGS. 13(a), (b) are first explanatory drawings illustrating an example in which the engine-cooling flow path and the exhaust-system-cooling flow path are washed by the cooling system for a jet propulsion boat according to the present invention.

The tap water hose 69a for supplying tap water (washing water) is attached on the cooling water discharge port 67 and washing water flows from the tap water hose 69a through the cooling water discharge port 67 to the third engine-cooling flow path 66. Washing water flowing through the third engine-cooling flow path 66 flows into the cylinder-head-cooling duct 65 and washes the cylinder-head-cooling duct 65.

Washing water that was used for washing the cylinder-head cooling duct 65 flows into the cylinder-block cooling duct 64 for washing the cylinder-block cooling duct 64.

Washing water that is used for washing the cylinder-block cooling duct 64 flows through the second engine cooling flow path 63 into the oil-cooler-cooling duct 62 for washing the oil-cooler-cooling duct 62. Washing water that was used for washing the oil-cooler-cooling duct 62 flows into the first engine-cooling flow path 61 and then flows from the first engine-cooling flow path 61 through the first diverged discharge port 51 and reaches the diverging duct 50.

Most of the cooling water out of washing water reaching the diverging duct 50 flows through the first exhaust-system-cooling flow path 71 to the feed port of the intercooler-cooling duct 72 and then flows through the intercooler-cooling duct 72 for washing the intercooler-cooling duct 72.

Washing water that was used for washing the intercooler-cooling duct 72 flows through the second exhaust-system-cooling flow path 73 to the exhaust-manifold-cooling duct 74 for washing the exhaust-manifold-cooling duct 74.

Washing water that was used for washing the exhaust-manifold-cooling duct 74 flows through the third exhaust-system-cooling flow path 75 to the turbocharger-cooling duct 76 to wash the turbocharger-cooling duct 76. Washing water that was used for washing the turbocharger-cooling duct 76 flows through the fourth exhaust-system-cooling flow path 77 to the exhaust-pipe-cooling duct 78 for washing the exhaust-pipe-cooling duct 78.

Washing water that was used for washing the exhaust-pipe-cooling duct 78 flows into the intake port of the fifth exhaust-system-cooling duct 79, and flows through the fifth exhaust-system-cooling flow path 79 and the cooling water discharge port 80 to the outside.

On the other hand, a small quantity of the washing water reaches the (shown in FIG. 6(b)) towards the intake path 41. Accordingly, the interior of the jet pump 20 can easily be washed with a small quantity of washing water passing through the fine flow paths 54a. . . .

Figure 14A:
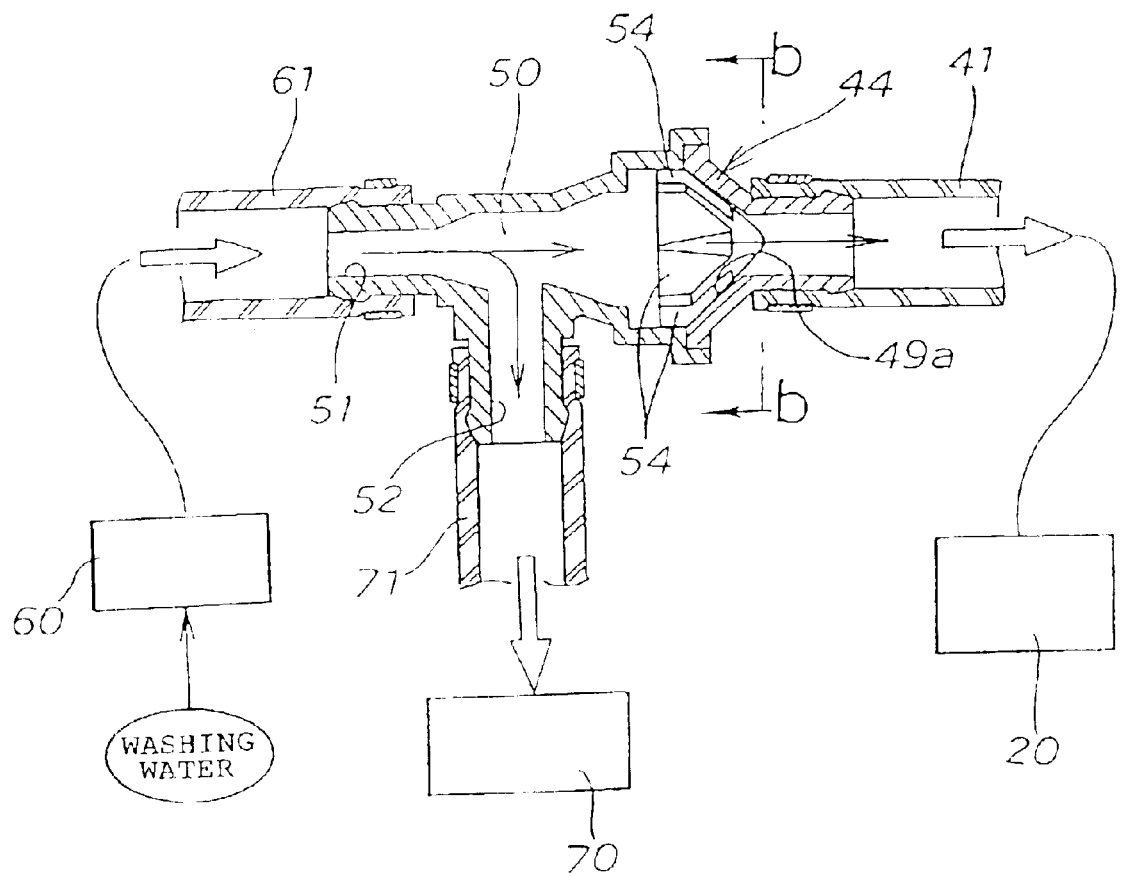
FIGS. 14(a) and 14(a) show second explanatory drawings illustrating an example in which the engine-cooling flow path and the exhaust-system-cooling flow path are washed by the cooling system for a jet propulsion boat according to the present invention.
Figure 14B:
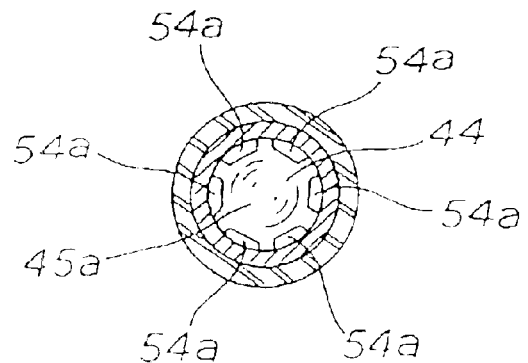

FIGS. 14(a) and 14(b) are second explanatory drawings illustrating an example in which the engine-cooling flow path and the exhaust-system-cooling flow path are washed by the cooling system for a jet propulsion boat according to the present invention. FIG. 14(a) shows a cross section of the one-way valve unit. FIG. 14(b) shows a cross-sectional view taken along the line b—b in FIG. 14(a).

When washing water flows from the first diverged discharge port 51 to the diverging duct 50, the valve body 44 is brought into abutment with the valve seat 49a by the hydraulic pressure of washing water. Since most of the intake path 41 can be closed by the valve body 44 by bringing the valve body 44 into abutment with the valve seat 49a, most of washing water reaching the diverging duct 50 flows towards the second diverged discharge port 52.

The cooling system 40 for a jet propulsion boat can prevent washing water from flowing from the diverging duct 50 towards the intake path 41 when washing the jet propulsion boat 10. Accordingly, it is possible to wash the engine-cooling flow path 60 by supplying washing water to the engine-cooling flow path 60 and supply the washing water to the exhaust-system-cooling flow path 70 by the one-way valve 43.

Therefore, since washing water that was used for washing the engine-cooling flow path 60 can be used for washing the exhaust-system-cooling flow path 70 the quantity of washing water consumed can be reduced.

Since the fine flow paths 54a . . . can be formed between the valve body 44 and the intake path 41 as shown in FIG. 14(b) when the valve body 44 of the one-way valve 43 is brought into abutment against the valve seat 49a, a small quantity of washing water out of washing water reaching the diverging duct 50 flows towards the intake path 41 through the fine flow paths 54a . . . of the one-way valve 43.

Accordingly, the jet pump 20 can easily be washed by a small quantity of washing water passing through the fine flow paths 54a . . . .

Though an example in which the oil cooler 19, the cylinder block 15a, and the cylinder head 15b are cooled in the engine-cooling flow path 60, and the intercooler 31, the exhaust manifold 32, the turbocharger 33, and the exhaust pipe 34 are cooled in the exhaust-system-cooling flow path 70 has been described in the aforementioned embodiment, the components to be cooled are not limited thereto, and may be determined according to the construction of the jet propulsion boat 10.

Though an example in which the cooling water discharge port 80 is disposed on the rear surface 11b on the left side of the saddle-riding type seat 29 has been described in aforementioned embodiment, the position of the cooling water discharge port 80 is not limited thereto. What is essential is that it must simply be at the portion of the rear surface 11b of the vessel body 11 except for the portion 29a immediately behind the saddle-riding type seat 29. Thus, the cooling water discharge port 80 may be provided for example on the rear surface 11b on the right side of the saddle-riding type seat 29 to exercise the same effect.

Furthermore, though an example in which the cooling system is the exhaust-system-cooling flow path 70 has been described in the aforementioned embodiment, it is not limited thereto. Thus, the cooling system may be applied to the engine-cooling flow path 60. In this case, the cooling water discharge port 67 of the engine-cooling flow path 60 may be provided on the rear surface 11b of the vessel body 11, except for the portion 29a immediately behind the saddle-riding seat 29. More specifically, the engine-cooling flow path 60 may be provided on the rear surface 11b on the left side of the saddle-riding type seat 29, as in the case of the cooling water discharge port 80 of the exhaust-system-cooling flow path 70.

In addition, the cooling system may be applied to both of the engine-cooling flow path 60 and the exhaust-system-cooling flow path 70.

The present invention exercises the following effects with the construction described above.

According to the present invention, with the provision of the discharge port from the cooling system on the rear surface of the vessel body except for the portion immediately behind the saddle-riding type seat, cooling water discharged from the discharge port may be prevented from being flowing into the footrest deck or splashing toward the footrest deck.

In addition, the discharge port from the cooling system is provided on the rear surface of the vessel body except for the portion immediately behind the saddle-riding type seat, that is, at the position offset from the portion immediately behind the seat. Therefore, the occupant can easily verify cooling water discharged from the discharge port and thus easily recognize the operating state of the cooling system.

According to the present invention, the position of the opening of the discharge port is provided in the vicinity of the lower side of the joint between the lower hull and the upper hull on the side of the lower hull. Therefore, since the position of the opening of the discharge port can be set to the position lower than the height of the footrest deck, cooling water discharged from the discharge port can be reliably prevented from flowing into the footrest deck or from splashing towards the footrest deck further.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A jet propulsion boat comprising:
   a vessel body constructed of a lower hull including a ship bottom and an upper hull superimposed thereon;
   a saddle-riding type seat extending in the fore-and-aft direction provided at the center of the upper surface of the upper hull;
   footrest decks provided on the left and right of the saddle-riding type seat;
   an engine and an exhaust system provided in an interior of the vessel body;
   a cooling system for forcing the engine to be cooled by water;
   a cooling water discharge port from the cooling system, said cooling water discharge port being provided on a rear surface of the vessel body, except for the portion immediately behind the saddle-riding type seat,
   the cooling water discharge port being a through hole extending from an inside to an outside of the rear surface, the cooling water discharge port having an axis inclined at a fixed angle relative to a line which is orthogonal to the rear surface of the vessel body,
   wherein the cooling water discharge port is inclined downwardly relative to the footrest decks.

2. The jet propulsion boat according to claim 1, wherein the discharge port is provided in the vicinity of the lower side of the joint between the lower hull and the upper hull on the side of the lower hull.

3. The jet propulsion boat according to claim 1, wherein the cooling water discharge port is inclined outwardly relative to the footrest decks for enhancing the visibility of the discharge of the cooling water.

4. The jet propulsion boat according to claim 1, wherein the cooling system is brought into communication with the cooling water discharge port by securing a flange to an inner side of the rear surface of the lower hull, wherein an entry portion extends from the flange so as to be orthogonal to the rear surface.

5. The jet propulsion boat according to claim 1, wherein the cooling discharge port is formed on a rear left side of the vessel.

6. The jet propulsion boat according to claim 1, wherein the cooling discharge port is formed on a rear right side of the vessel.

7. A cooling water discharge port for a jet propulsion boat comprising:
   a vessel body including a rear surface;
   an engine and an exhaust system operatively mounted within an interior of the vessel body; and
   a cooling system for cooling the engine and the exhaust system, the cooling water discharge port being operatively connected to the cooling system, and being provided on the rear surface of the vessel body to be visible to an operator of the vessel during use, the cooling water discharge port being a through hole extending from an inside to an outside of the rear surface, the cooling water discharge port having an axis inclined at a fixed angle relative to a line which is orthogonal to the rear surface of the vessel body, wherein the cooling water discharge port is inclined downwardly relative to the vessel.

8. The cooling water discharge port for a jet propulsion boat according to claim 7, wherein the discharge port is provided in the rear surface of the vessel and is displaced from an upper surface of the vessel for discharging the cooling water therefrom.

9. The cooling water discharge port for a jet propulsion boat according to claim 7, wherein the cooling water discharge port is inclined outwardly relative to the vessel for enhancing the visibility of the discharge of the cooling water.

10. The cooling water discharge port for a jet propulsion boat according to claim 7, wherein the cooling water discharge port inclines downwardly and outwardly as it passes through the rear surface of the vessel body.

11. The cooling water discharge port for a jet propulsion boat according to claim 7, wherein the cooling system is brought into communication with the cooling water discharge port by securing a flange to an inner side of the rear surface of the lower hull, wherein an entry portion extends from the flange so as to be orthogonal to the rear surface.

12. The cooling water discharge port for a jet propulsion boat according to claim 7, wherein the cooling discharge port is formed on a rear left side of the vessel.

13. The cooling water discharge port for a jet propulsion boat according to claim 7, wherein the cooling discharge port is formed on a rear right side of the vessel.

* * * * *